United States Patent
Zhang et al.

(10) Patent No.: US 11,829,890 B2
(45) Date of Patent: Nov. 28, 2023

(54) AUTOMATED MACHINE LEARNING: A UNIFIED, CUSTOMIZABLE, AND EXTENSIBLE SYSTEM

(71) Applicant: HITACHI VANTARA LLC, Santa Clara, CA (US)

(72) Inventors: Yongqiang Zhang, Santa Clara, CA (US); Wei Lin, Santa Clara, CA (US); William Schmarzo, Santa Clara, CA (US)

(73) Assignee: HITACHI VANTARA, LLC, Santa Clara, CA (US)

( * ) Notice: Subject to any disclaimer, the term of this patent is extended or adjusted under 35 U.S.C. 154(b) by 0 days.

(21) Appl. No.: 17/922,582

(22) PCT Filed: Jun. 25, 2020

(86) PCT No.: PCT/US2020/039647
§ 371 (c)(1),
(2) Date: Oct. 31, 2022

(87) PCT Pub. No.: WO2021/262179
PCT Pub. Date: Dec. 30, 2021

(65) Prior Publication Data
US 2023/0132064 A1    Apr. 27, 2023

(51) Int. Cl.
*G06N 5/02*        (2023.01)
*G06N 5/022*       (2023.01)

(52) U.S. Cl.
CPC .............. *G06N 5/022* (2013.01); *G06N 5/027* (2013.01)

(58) Field of Classification Search
CPC .............................. G06N 5/022; G06N 5/027
See application file for complete search history.

(56) References Cited

U.S. PATENT DOCUMENTS

| | | | |
|---|---|---|---|
| 11,562,267 B2 * | 1/2023 | Polleri | G06F 40/40 |
| 11,599,826 B2 * | 3/2023 | Khurana | G06N 20/00 |
| 2014/0149331 A1 * | 5/2014 | Iorio | G06F 17/11 |
| | | | 706/46 |
| 2016/0063209 A1 | 3/2016 | Malaviya | |

(Continued)

OTHER PUBLICATIONS

Swearingen et al. "ATM: A distributed, collaborative, scalable system for automated machine learning." In: 2017 IEEE International Conference on Big Data (Big Data). Dec. 2017 (Dec. 2017) Retrieved on Aug. 16, 2020 (Aug. 16, 2020) from <http://www.thswear.com/files/SwearingenEtAl-ATM-BigData2017.pdf> entire document.

(Continued)

*Primary Examiner* — Omar F Fernandez Rivas
*Assistant Examiner* — Tri T Nguyen
(74) *Attorney, Agent, or Firm* — Procopio, Cory, Hargreaves & Savitch LLP

(57) ABSTRACT

Example implementations described herein are directed to a novel Automated Machine Learning (AutoML) framework that is generated on an AutoML library so as to facilitate functionality to incorporate multiple machine learning model libraries within the same framework through a solution configuration file. The example implementations further involve a solution generator that identifies solution candidates and parameters for machine learning models to be applied to a dataset specified by the solution configuration file.

5 Claims, 13 Drawing Sheets

(56) References Cited

U.S. PATENT DOCUMENTS

| | | | |
|---|---|---|---|
| 2016/0110657 A1 | 4/2016 | Gibiansky et al. | |
| 2016/0203318 A1 | 7/2016 | Avasarala et al. | |
| 2016/0358099 A1 | 12/2016 | Sturlaugson et al. | |
| 2017/0154103 A1* | 6/2017 | Agarwalla | G06F 16/353 |
| 2018/0060738 A1* | 3/2018 | Achin | G06N 20/00 |
| 2019/0132203 A1* | 5/2019 | Wince | G06F 9/44505 |
| 2019/0355438 A1* | 11/2019 | Venn | G16B 40/00 |
| 2020/0356360 A1* | 11/2020 | Gupta | G06F 17/16 |
| 2021/0027182 A1* | 1/2021 | Harris | G06N 20/20 |
| 2021/0264311 A1* | 8/2021 | Mukherjee | G06N 20/00 |
| 2022/0351049 A1* | 11/2022 | Wang | G06N 20/00 |

OTHER PUBLICATIONS

Feurer et al. "Efficient and robust automated machine learning." In: Advances in neural information processing systems. 2015 (2015) Retrieved on Aug. 16, 2020 (Aug. 16, 2020) from <http://papers.nips.cc/paper/5872-efficient-and-robust-automated-machine-learning.pdf> entire document.

International Search Report for related PCT Application No. PCT/US2020/039647, dated Sep. 3, 2020, 1 page.

Written Opinion of the International Searching Authority for related PCT Application No. PCT/US2020/039647, dated Sep. 3, 2020, 5 pages.

\* cited by examiner

| Dataset/Solution | Solution Category 1 | Solution Category 2 | Solution Category 3 | ... |
|---|---|---|---|---|
| Dataset 1 | Performance score 1 | NULL | Performance score 6 | ... |
| Dataset 2 | Performance score 2 | NULL | NULL | ... |
| Dataset 3 | NULL | NULL | Performance score 7 | ... |
| Dataset 4 | Performance score 3 | Performance score 5 | Performance score 8 | ... |
| Dataset 5 | Performance score 4 | NULL | NULL | ... |
| Dataset 6 | NULL | NULL | Performance score 9 | ... |

FIG. 5(d)

AUTOMATED MACHINE LEARNING: A UNIFIED, CUSTOMIZABLE, AND EXTENSIBLE SYSTEM

BACKGROUND

Field

The present disclosure is directed to automated machine learning, and more specifically for providing a unified, customizable and extensible system on the automated machine learning framework.

Related Art

Automated Machine Learning (AutoML) is a system or framework that can automatically build model(s) for the data provided by the user by applying data and feature preprocessing steps, selecting model algorithms, and tuning hyperparameters to achieve the best evaluation metrics provided by the user.

AutoML is designed to automate the maximum number of steps in a machine learning (ML) pipeline, which minimizes the human effort required without compromising the model performance. Several open source and commercial AutoML packages have been designed and implemented. Each package has its own strengths and weaknesses.

SUMMARY

Related art AutoML libraries have limitations and restrictions. For example, related art AutoML libraries only support one underlying machine learning library, but each machine library uses different application programming interfaces (APIs). For data scientists, it is difficult to learn and use all of the APIs. Real-world tasks may need to use multiple machine libraries, which require extensive development time to both learn and effectively use. There is a need for a unified and extensible framework to support multiple machine libraries which can be extended easily with state-of-the-art machine learning and data analytics methods.

Further, the related art AutoML libraries exhaustively try a fixed set of model algorithms in a predefined order until the time limit expires. The optimal algorithm and parameter settings may never be applied because of the time limit. Therefore, there is a need for a customizable framework to adjust and tune the default modeling configurations for different tasks.

Further, related art AutoML libraries approach each task as a new one so it does not use the knowledge learned from previous problems, data, and models. It ignores the specifics and characteristics of the problem and data; it also ignores the specialty, strengths and drawbacks of the model algorithms when building the model. Therefore, there is a need for a solution that leverages the existing data, problem, and solutions to increase efficiency to produce the best model for a new problem and data.

Aspects of the present disclosure involve a method, involving generating an automated machine learning (AutoML) framework configured to input a plurality of machine learning libraries corresponding to a plurality of machine learning models specified in a solution configuration file; extracting metadata from a dataset specified by the solution configuration file; generating solution candidates for the dataset from the plurality of machine learning models specified in the solution configuration file by relating the extracted metadata to historical metadata; refining the solution candidates based on historical metadata; optimizing the solution candidates through a selection of parameters for the plurality of machine learning models; and evaluating the solution candidates from the plurality of machine learning models based on evaluation parameters specified in the solution configuration file.

Aspects of the present disclosure can involve a computer program storing instructions, involving generating an automated machine learning (AutoML) framework configured to input a plurality of machine learning libraries corresponding to a plurality of machine learning models specified in a solution configuration file; extracting metadata from a dataset specified by the solution configuration file; generating solution candidates for the dataset from the plurality of machine learning models specified in the solution configuration file by relating the extracted metadata to historical metadata; refining the solution candidates based on historical metadata; optimizing the solution candidates through a selection of parameters for the plurality of machine learning models; and evaluating the solution candidates from the plurality of machine learning models based on evaluation parameters specified in the solution configuration file.

Aspects of the present disclosure can involve a system involving means for generating an automated machine learning (AutoML) framework configured to input a plurality of machine learning libraries corresponding to a plurality of machine learning models specified in a solution configuration file; means for extracting metadata from a dataset specified by the solution configuration file; means for generating solution candidates for the dataset from the plurality of machine learning models specified in the solution configuration file by relating the extracted metadata to historical metadata; means for refining the solution candidates based on historical metadata; means for optimizing the solution candidates through a selection of parameters for the plurality of machine learning models; and means for evaluating the solution candidates from the plurality of machine learning models based on evaluation parameters specified in the solution configuration file.

Aspects of the present disclosure can involve an apparatus, which can include a processor, configured to generate an automated machine learning (AutoML) framework configured to input a plurality of machine learning libraries corresponding to a plurality of machine learning models specified in a solution configuration file; extract metadata from a dataset specified by the solution configuration file; generate solution candidates for the dataset from the plurality of machine learning models specified in the solution configuration file by relating the extracted metadata to historical metadata; refine the solution candidates based on historical metadata; optimize the solution candidates through a selection of parameters for the plurality of machine learning models; and evaluate the solution candidates from the plurality of machine learning models based on evaluation parameters specified in the solution configuration file.

BRIEF DESCRIPTION OF DRAWINGS

FIG. 5(d) illustrates an example data table for providing performance scores to datasets and solution categories, in accordance with an example implementation.

DETAILED DESCRIPTION

Figure 1:
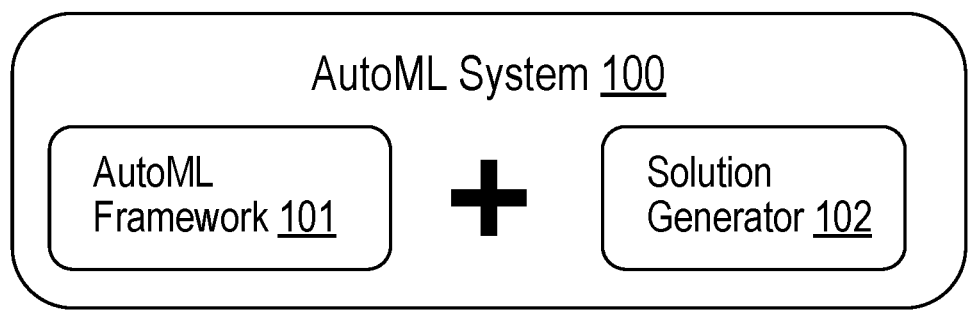
FIG. 1 illustrates an example AutoML system in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example AutoML system 100 in accordance with an example implementation. As illustrated in FIG. 1, the AutoML system 100 involves two components, the AutoML Framework 101 and the solution generator 102.

In the example of FIG. 1, the AutoML Framework 101 is a unified, highly customizable, and highly extensible AutoML Framework 101 which provides a unified and easy-to-use interface for various underlying machine learning libraries, is easily extended with state-of-the-art machine learning and data analytics methods, and can be customized to meet the need of different data science tasks. Thus, the AutoML framework 101 is configured to input a set of machine learning libraries, and the AutoML Framework 101 supports multiple libraries even if the libraries are developed independently by different developers.

The solution generator 102 functions like a processor or pipeline that can utilize existing solutions to optimize the solutions for new problem and data. Further details are provided in FIG. 2(a).

The proposed AutoML Framework 101 can thereby remedy deficiencies in the related art AutoML library which is static with a fixed predefined machine learning library, from which only a single machine learning library can be loaded.

Through the proposed AutoML Framework 101 and the solution configuration file proposed herein, multiple machine learning libraries can be incorporated into the framework and the selected models in the solution configuration file, and the framework can be customized through the solution configuration file in accordance with the desired implementation.

Figure 2A:
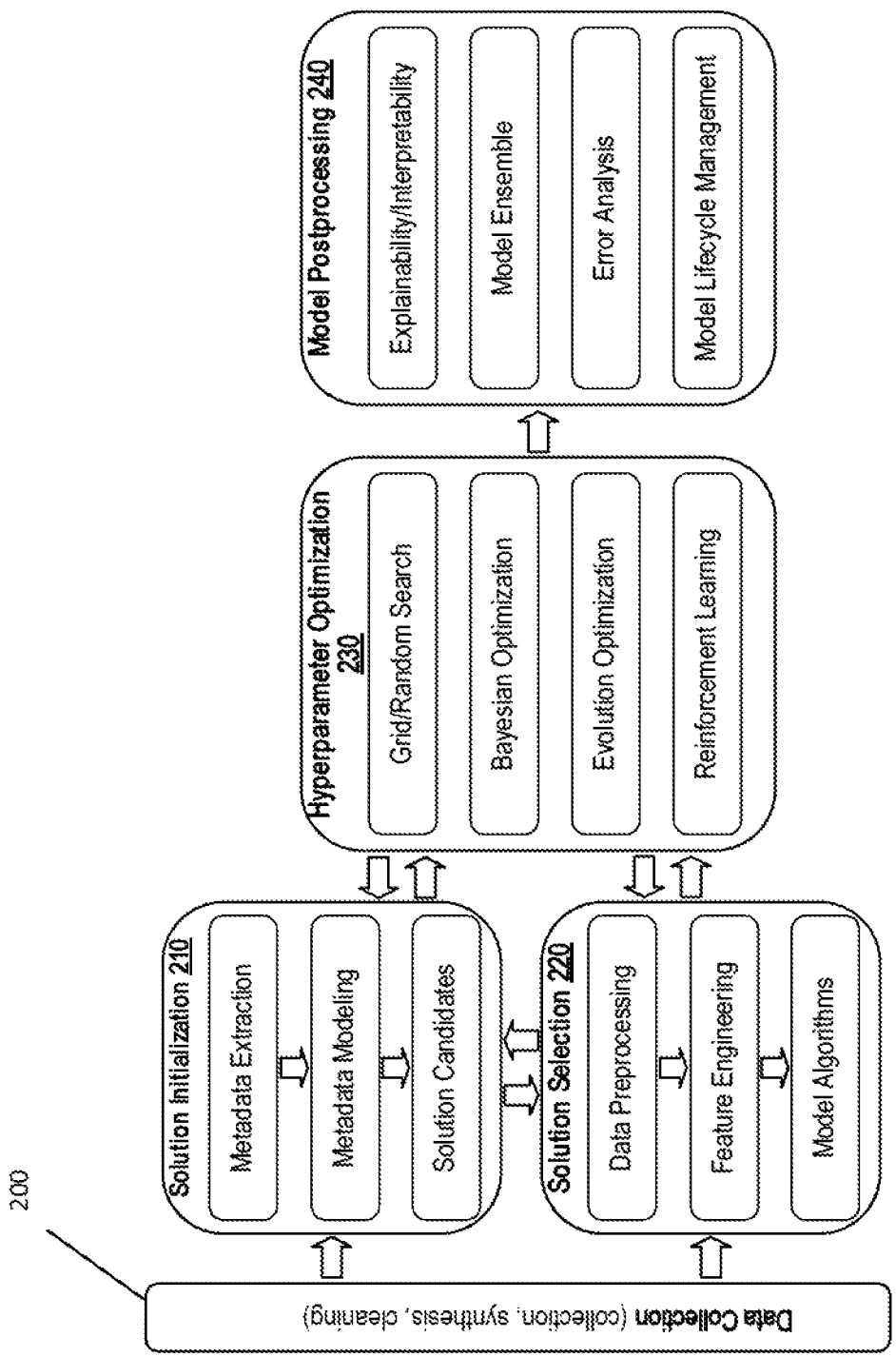
FIG. 2(a) illustrates an example solution generator, in accordance with an example implementation.

FIG. 2(a) illustrates an example solution generator, in accordance with an example implementation. Solution Generator is a process that uses existing solutions to optimize new solutions which efficiently and effectively initializes solutions for new datasets based on existing solutions, optimizes the solution search space and search order with innovative approaches, automates solution selection and hyperparameter optimization with state-of-the-art methods, and provides new components and features: data preparation (resampling, synthesis, splitting); result interpretability and explainability; error analysis; automatic feature extraction and construction; model lifecycle management, and so on.

As illustrated in FIG. 2(a), data collection 200 can include collection, synthesis and cleaning functions on the data. The data collected from the data collection is incorporated into various modules including a solution initialization module 210, a solution selection module 220, a hyper parameter optimization module 230, and a post-processor module 240.

Data collection 200 intakes a dataset for a new problem to be solved by the solution, upon which processes such as data cleaning, data preprocessing, and so on are conducted. The dataset is the data that need to be analyzed and built model upon, which includes but not limited to: the data comes with the problem (for instance, data collected by sensor), data found in the public domain (for instance, from internet), and data purchased from third party, etc. The dataset is usually provided together with the problem. If the provided dataset is not enough to build solutions based on the understanding of the problem and data, new data is requested from the problem and data provider and/or the public domain. And if there is no new data available, new data can be synthesized based on the data that is currently available. The data collection 200 is then provided to the solution initialization 210 and the solution selection 220. Given a new problem and associated dataset which is required to build solutions upon, models are executed against the new problem to determine if there is a similar problem data set in the historical database. If so, then the example implementations utilize a solution for a similar problem to initialize the solution for the new problem at 210, which can be selected in solution selection 220.

Once the selection candidates are obtained from solution selection 220, the existing solutions are optimized to fit into the new problem and data to obtain the optimal solution through hyperparameter optimization 230. Once the hyperparameter optimization 230 optimizes the solution to fit into the new problem, the solution is then evaluated in postprocessing 240 to determine if the optimized solution meets the success criteria which is predetermined. If so, then additional postprocessing 240 such as integrating the model in ensemble with other models, if parameters should be changed, and so on depending on the desired implementation. Further details of each of the modules are provided with respect to FIGS. 3-7.

In the example implementations of the AutoML Framework, there is a unified, extensible, and customizable AutoML framework configured to incorporate multiple machine libraries. In example implementations, the framework formulates each solution into two pieces, a solution configuration file and a main program. The solution configuration file defines all the goals that need to be facilitated in the solution.

Figure 2B:
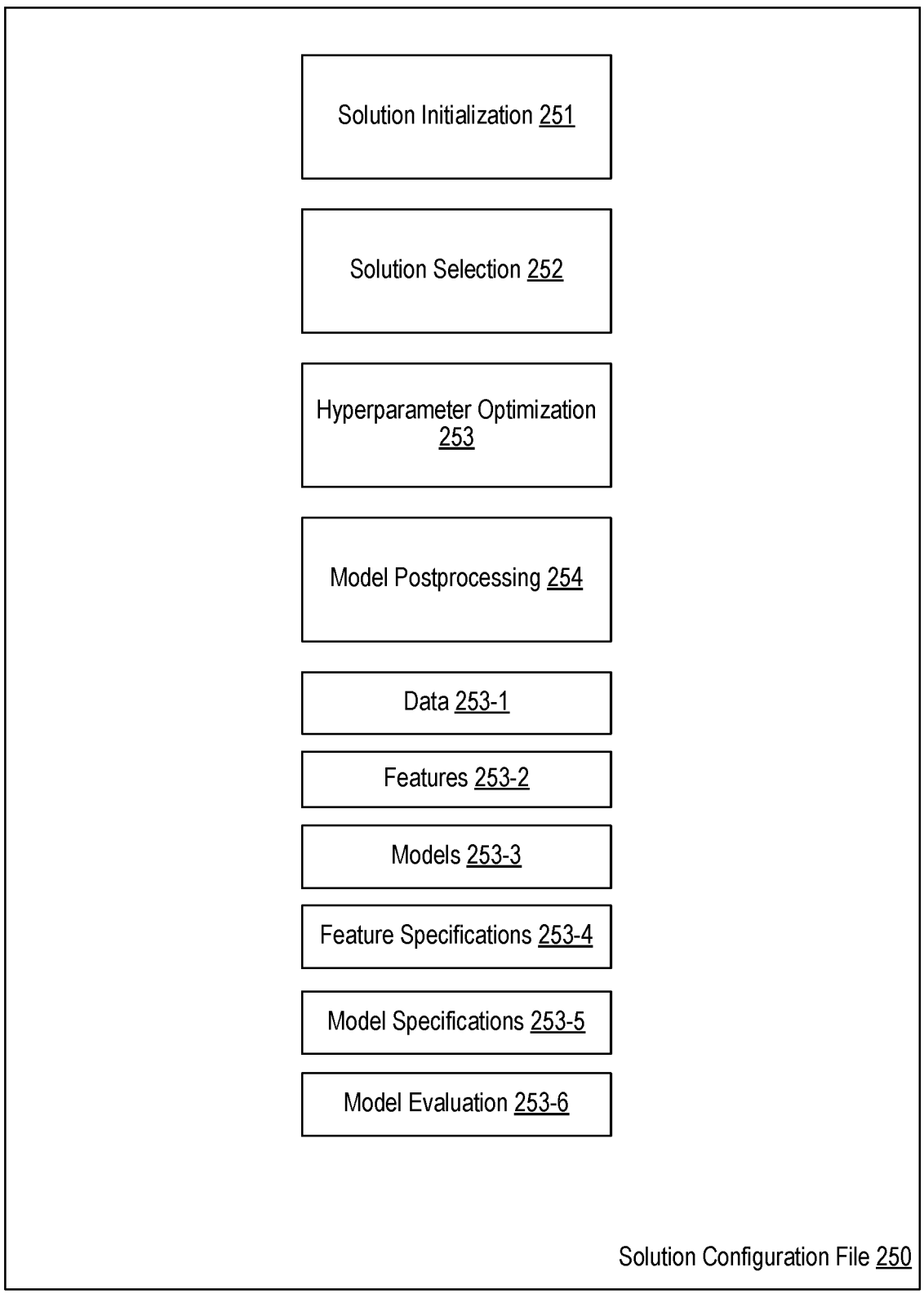
FIG. 2(b) illustrates an example solution configuration file, in accordance with an example implementation.

FIG. 2(b) illustrates an example solution configuration file, in accordance with an example implementation. Each solution has a solution configuration file, which is used to specify all the details of the solution. In example implementations described herein, the solution configuration file 250 has a section for each module in FIG. 2(a) to specify configurations and instructions on how to execute each module. The configuration can include a section for each module; if more specifications are needed for each module, sub-sections are used to specify such details. The example solution configuration file specifies more details on the hyperparameter optimization 230, including what data is used, how features will be processed, what models are to be used, the model algorithm for each of the models, how the models are to be evaluated, the parameters for the models, and other parameters in accordance with the desired implementation. For some module (for instance, Models 253-3), the specifications in the solution configuration file may include what model algorithms in the underlying machine learning libraries need to be called, what parameters need to be passed to the model algorithms, and so on. A solution configuration file 250 is used to define each problem into consideration in each solution. For example, in a machinery situation, there may be a classification and regression problem, which is thereby specified with the whole solution, including how the data is to be preprocessed, how the feature engineering is conducted, what models are selected, parameter tuning, post processing, evaluation and so on.

The solution modules of FIG. 2(a) parse through the solution configuration file and obtain the libraries from the AutoML to execute according to the file.

Example implementations utilize the solution configuration file to define and specify the solution, and use a Python reflection technique to read and parse the solution configuration file. Through such example implementations, the outcome is that various analytics library and machine learning libraries can be used together in one solution.

In example implementations, the main program is the entry point to each solution and is configured to read the solution configuration file, follow the definition of each module and execute the module accordingly.

The solution configuration file features the following key attributes. The solution configuration file is unified such that machine learning methods, such as feature engineering and model algorithms from multiple machine learning libraries, can be specified in a single solution configuration file. The solution configuration file is extensible such that the solution is easily extended with state-of-the-art techniques by adding a section to the solution configuration file. The solution configuration file is customizable. An optimized and general-purpose solution template is provided for each solution type, including but not limited to: classification, regression, clustering, anomaly detection, recommendation engine, remaining useful life prediction. For hyperparameter optimization purpose, the template specifies all the possible feature engineering techniques and associated parameter grids, the model algorithms and associated parameter grids, and the evaluation techniques. If solution initialization module and/or solution selection module exist(s), they can select the list of feature engineering and modeling techniques for a specific solution, and the specifications for the selected techniques in the template are used for the solution accordingly. Users can choose to use the solution configuration template; or easily customize the solution configuration template to meet their own needs.

Solution configuration file 250 can include solution initialization 251, solution selection 252, hyperparameter optimization 253, model postprocessing 254, data 253-1, features 253-2, models 253-3, feature specifications 253-4, model specification 253-5, and model evaluation 253-6. Solution initialization 251 can indicate the location of the new dataset, and the location of the solution initialization models. Solution selection 252 can indicate the location of new dataset, and the location of solution selection models. Hyperparameter optimization 253 can indicate the list of sub-sections for optimizing the solution candidates. The sub-sections for hyperparameter optimization 253 can be: data 253-1, features 253-2, models 253-3, feature specifications 253-4, model specification 253-5, and model evaluation 253-6. Data 253-1 can indicate the data source or the data file from which data is to be extracted and input for the hyperparameter optimization 253, and can include parameters such as labels, types of features involved, data splits, and so on in accordance with the desired implementation. Data 253-1 can also specify the input as well as the output. Features 253-2 indicate parameters for feature extraction, such as enabling/disabling extracting correlated features, variance thresholds based feature selection, and so on, in accordance with the desired implementation. Models 253-3 indicates the models to be applied to the data 253-1, such as, but not limited to, logistic regression, random forest classifier, gradient boosting classifier, support vector machine classifier, neural network classifier, and so on depending on the desired implementation. Feature specifications 253-4 can indicate the parameters for the features 253-2 that are incorporated. Model specifications 253-5 indicate the parameters for the models 253-3 that are incorporated. Evaluation 253-6 indicates the metrics used to evaluate the models 253-3.

In example implementations, the solution generator is an end-to-end process to generate solutions when given a problem and data. There are five modules in the generator, as illustrated in FIG. 2(a).

Figure 2C:
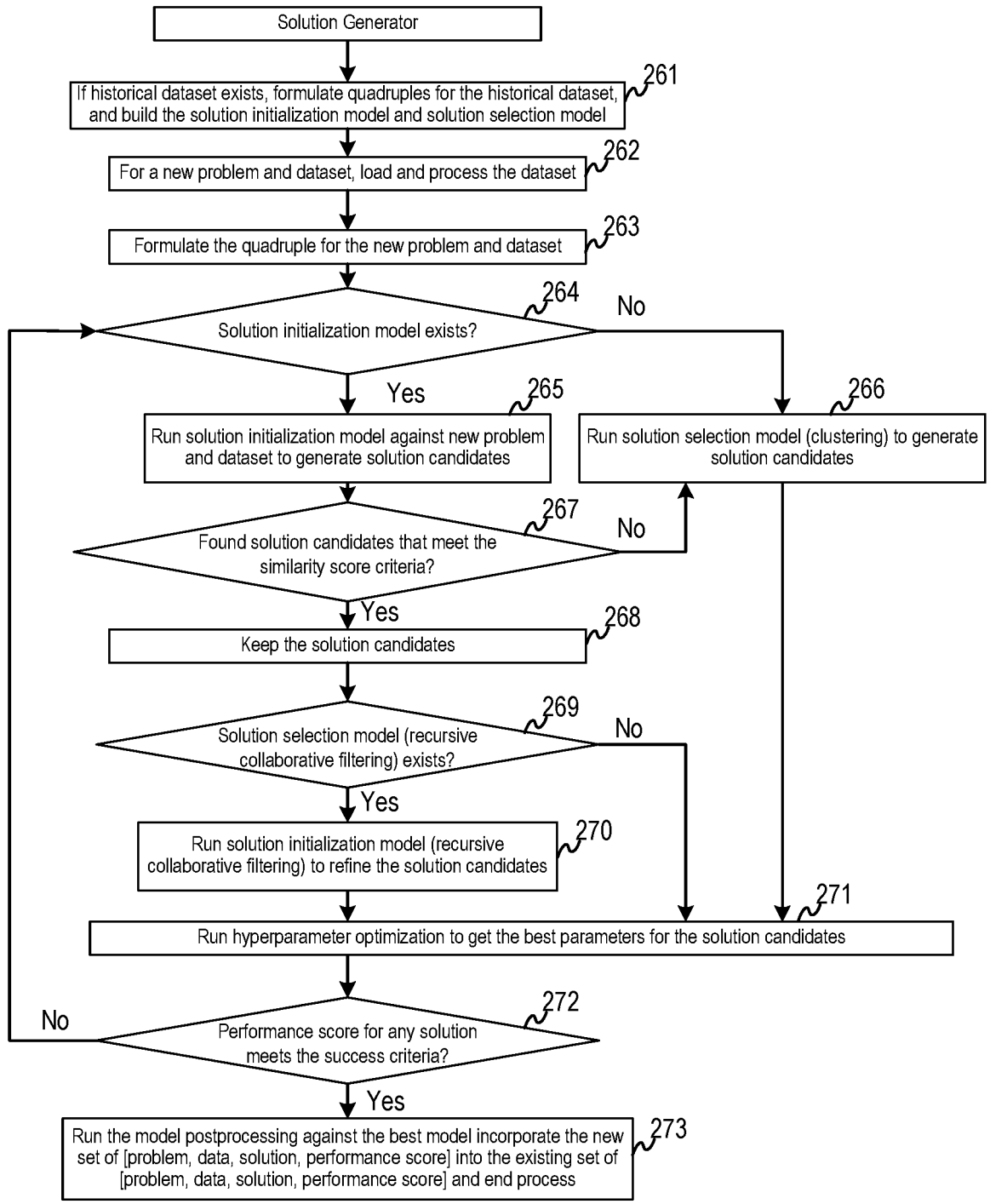
FIG. 2(c) illustrates an example flow diagram for the solution generator, in accordance with an example implementation.

In example implementations, the solution generator is used to generate solutions for problems. FIG. 2(c) illustrates an example flow diagram for the solution generator, in accordance with an example implementation. The following steps describe the workflow of the solution generator. More details for each component are detailed further herein.

At 261, if a database of historical problems and data exist and solutions have been built for each problem and data in the database, the solution generator formulates the quadruples [problem, data, solution, performance score] based on the database, and uses them to train a solution initialization model and a solution selection model. Given a new problem and dataset, the solution generator performs the following actions from 262-273. In another example implementation, the model building can be conducted separately (e.g. offline) such that the solution initialization and solution selection models are built offline and the process at 261 is thereby configured to load the models if they exist instead.

Solution initialization model and solution selection model both rely on the database that store the historical problems, data, solutions and their performance. In our implementation, the database has three tables:
1. "Problem": it defines and contains information and metadata about the problem:
   i) problem identifier: a unique identifier of the problem
   ii) problem description: a description of the problem iii) problem category: a categorical value: supervised, unsupervised, reinforcement learning
iv) problem industry: the industry of the problem, like "oil & gas", "mining", etc.
v) problem subindustry: the subindustry of the problem, like "coal mining", "ore mining", etc.
vi) data identifier: it is used to refer to the data in "Data" table.
2. "Data": it defines and contains information and metadata about the data:
i) data identifier: a unique identifier of data
ii) data description: a description of the data
iii) number of columns: number of columns in the data
iv) number of numerical columns: number of numerical columns in the data
v) number of categorical columns: number of categorical columns in the data
vi) number of data points: number of data points or rows in the data
vii) data size: the storage space that is occupied by the data
viii) data statistics
  (1) Numerical columns: minimum, maximum, mean, 1% quantile, 25% quantile, 75% quantile, 90% quantile, data skewness for each numerical column
  (2) Categorical columns: number of categorical values for each categorical column; minimum, maximum, mean, 1% quantile, 25% quantile, 75% quantile, 90% quantile, data skewness for the number of categorical values for all categorical columns
3. "Solution": it defines and contains the information and metadata of each solution:
i) solution identifier: a unique identifier of a solution
ii) solution description: a description of the solution
iii) solution configuration file: the content of the solution configuration file that is used to generate the solution
iv) solution category: an ordered list of feature engineering steps and model.
v) solution parameters: an ordered list of parameters for each step in the solution category that can achieve the best performance. The step name will be prefixed to the parameter names so as to differentiate the parameter names for each step.
vi) performance score: the performance score associated with "solution category" and "solution parameters". This is based on the evaluation metrics that is predetermined as part of hyperparameter optimization.
vii) problem identifier: this is used to refer to the "Problem" table
viii) data identifier: this is used to refer to the "Data" table In the implementation, the solution is defined as a combination of "solution category" and "solution parameters", and each problem and data can have multiple solutions. "solution categories" and "solution parameters" are obtained after running hyperparameter optimization against the data.

At 262, the solution generator loads and pre-processes the dataset. At 263, the solution generator formulates the quadruple [problem metadata, data metadata, solution metadata, performance score], where solution metadata and performance score are missing at this point of time. At 264, if a solution initialization model exists, at 265 the solution generator runs the solution initialization model against the new problem and dataset to get several solution candidates. Otherwise, (No), at 266 the solution generator runs the solution selection model (clustering) against the new problem and dataset to get several solution candidates. At 267, the solution generator checks if the solution candidates meet the criteria, for instance, the similarity score between the metadata of new problem and dataset, and the metadata for existing problems and data associated with the solution candidates. If so, (Yes), proceeds to 268 to keep solution candidates, and then proceeds to 269. Otherwise, (No), proceeds to 266. At 269, if a solution selection model (recursive collaborative filtering) exists, the solution generator proceeds to 270 to run solution selection model (recursive collaborating filtering) to refine the solution candidates; then the solution generator proceeds to 271 for hyperparameter optimization against the solution candidates. Otherwise, (No), the solution generator proceeds to 271 for hyperparameter optimization against the solution candidates.

At 271, the solution generator runs the hyperparameter optimization for the solution candidates and gets the performance scores. At 272, a determination is made as to whether the performance score for any solution meets the success criteria. If so (Yes), then the solution generator proceeds to 273 and runs model postprocessing against the best model(s). Then, the solution generator incorporates the new set of [problem, data, solution, performance score] into the existing set of [problem, data, solution, performance score], and ends the process. Otherwise, (No), the solution generator proceeds back to 264, adjusting the parameters, and runs the solution initialization model and solution selection model to get more solution candidates.

The following describes the details of each module in the solution generator.

Figure 3:
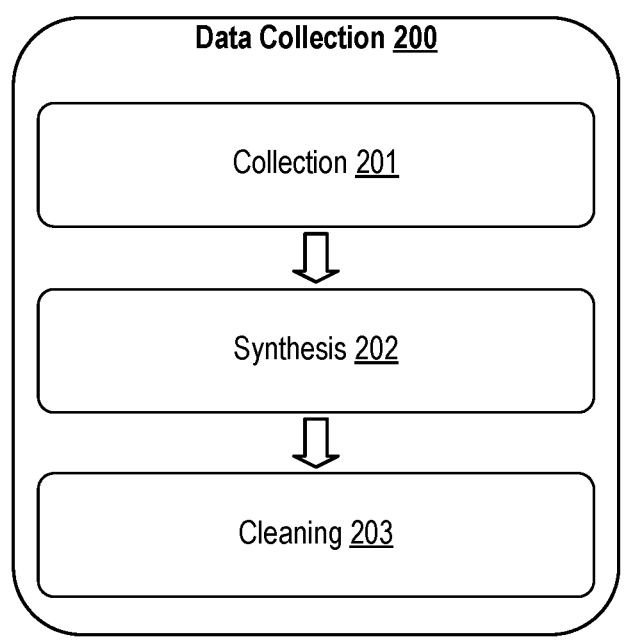
FIG. 3 illustrates an example of the data collection module, in accordance with an example implementation.

FIG. 3 illustrates an example of the data collection module 200, in accordance with an example implementation. The data collection module 200 is responsible for the collection 201 of data ETL (Extraction, Transformation, and Loading) of data provided by the user. It also performs data synthesis 202 if the provided data is not sufficient or if the solution based on the provided data is not valid. A user may need to perform some data preprocessing in this module, depending on the desired implementation. Data cleaning 203 is also employed to format or parse the data properly into formats that can be processed by the other modules.

Figure 4:
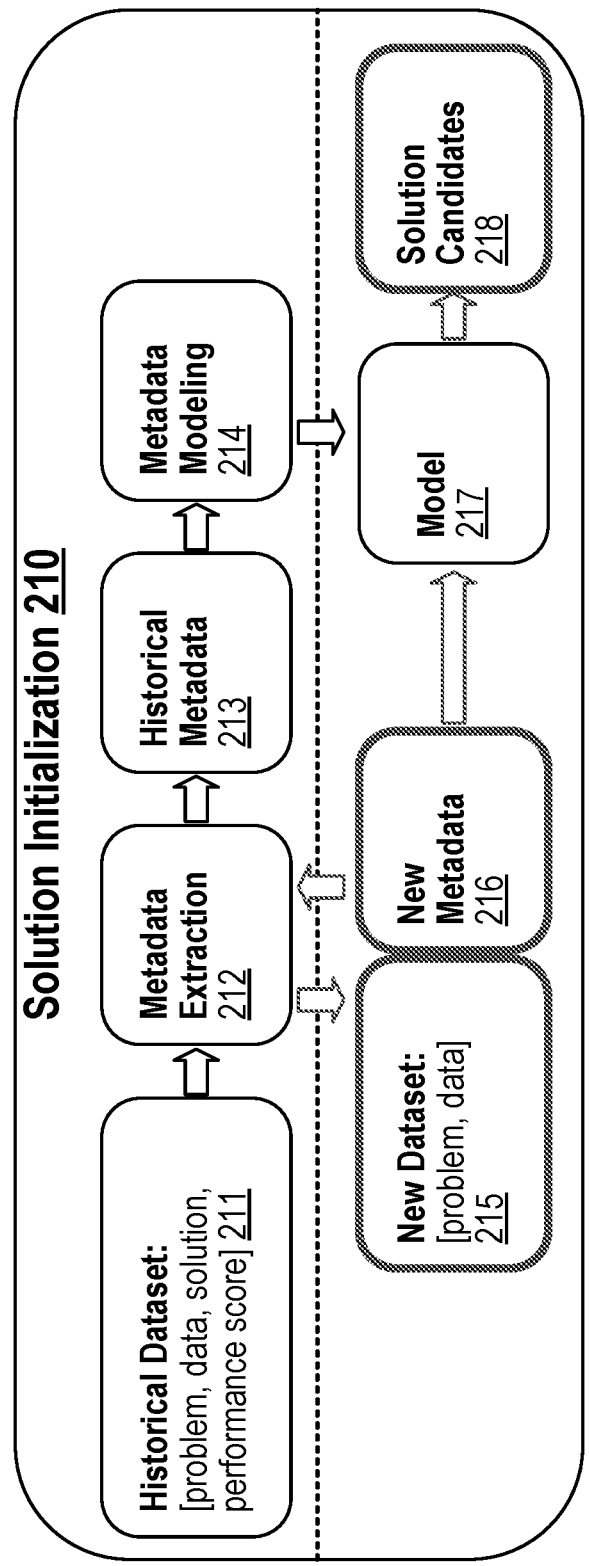
FIG. 4 illustrates an example of the solution initialization module, in accordance with an example implementation.

FIG. 4 illustrates an example of the solution initialization module 210, in accordance with an example implementation. The solution initialization module 210 efficiently and effectively initializes solutions for new problems and data based on existing problems, data, solutions, and the performance scores associated with the solutions. As part of the solution generator, machine learning models are built to initialize the solutions. Solution initialization module has two phases: first building the models (211-214) and then applying the model to new problem and data (215-218). All the required information that need to build and run the model are specified in the solution configuration file under "Solution Initialization" section, including the location of data files and model files, the specifications of metadata model algorithms, etc.

Given the historical dataset and solutions 211, the solution initialization module 210 will first extract metadata at 212, and build a solution initialization model 217 based on the existing problems, data, solutions, and the performance scores associated with the solutions as shown in the submodules of 211-214 and 217.

The metadata extraction sub-module 212 identifies and extracts metadata features for the problem and data to generate historical metadata 213. For the existing problem and data, the user first forms a quadruple: [problem, dataset, solution, performance score]. Then, the metadata extraction sub-module 212 computes the metadata of the problem, dataset, and model algorithms to obtain: [metadata of problem, metadata of data, metadata of solution, performance score] for historical metadata 213. The metadata of problems, data and algorithms can be predefined and/or customized in accordance with the desired implementation (e.g., manually engineered, automatically generated with an automatic tagging tool, and so on). Some clustering methods may be used for this purpose as well.

The definition of a quadruple (problem, data, solution, performance score) can be as follows:
  a. Problem: it is the analytic problem that needs to be resolved. For instance, "predict overloading failures in tailing asset in coal mining plant".
  b. Data: it is all the data that can help solve the problem. This includes all the data coming from the problem, public data, third-party data, etc. For instance, "sensor time series data from Pi Historian database", "weather data", etc.
  c. Solution: This corresponds to all the feature engineering and modeling steps defined in the solution configuration file and the parameters used in each step. In another word, it is a combination of "solution category" and "solution parameters". For example, solution category can be: "standard scaler, random forest model"; solution parameters can be: "with_mean=True" for "standard scaler", "number of trees=100, max_depth=5" for "random forest model".
  d. Performance score: it is a score based on a predetermined evaluation metrics for the solution. For example, "root mean squared error=0.05"

As described previously, there is a database to store the information for such quadruples for historical problem and data.

The metadata modeling sub-module 214 builds one of the following models on the extracted features as model 217:
  a. Similarity-based model: The metadata modeling sub-module 214 selects similarity metrics and builds a similarity-based model to measure the similarity score between feature vectors based on [metadata of problem, metadata of data]. Example similarity metrics can be cosine similarity, Pearson correlation score, etc.
  b. Regression model: The metadata modeling sub-module 214 builds a regression model based on the set of [metadata of problem, metadata of data, metadata of solution, performance score], where metadata of problem, metadata of data, metadata of solution are used as features in the regression model, and performance score is used as target in the regression model. Example regression models can be linear regression, random forest regression, etc.
  c. Other meta-learning models: The metadata modeling sub-module 214 uses another type of meta-learning model in accordance with the desired implementation.

Given a new problem and dataset 215, the solution generator automatically extracts the [metadata of problem, metadata of data] through metadata extraction 212 as new metadata 216, then applies the metadata model 217 to the new metadata 216, to generate solution candidates for the new problem and data 218.

For the similarity model, model 217 measures the similarity between the metadata of the new problem and dataset 216, and the metadata of existing problems and datasets 213. Based on the similarity score and performance score, model 217 selects the top N solutions, where N is a parameter that controls how many solutions will be used as the initial solution for the new problem and dataset.

For the regression model, model 217 builds test sets by appending all possible metadata of solutions to the [metadata of problem, metadata of data] 216. Then, model 217 applies the regression model to the test set and makes a prediction based on the performance score. Model 217 selects the top N solutions based on the predicted performance score.

Figure 5A:
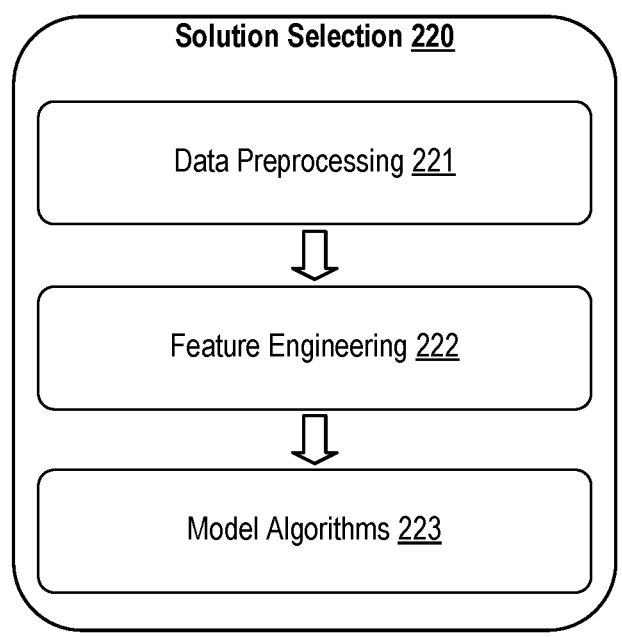
FIG. 5(a) illustrates an example of the solution selection module, in accordance with an example implementation.

FIG. 5(a) illustrates an example of the solution selection module 220, in accordance with an example implementation. The solution selection module 220 refines the solution search space and search order. The solution selection module 220 can involve sub-functions such as data preprocessing 221, feature engineering 222, and model algorithms 223. The solution selection module 220 is provided with solution candidates from the solution initialization module 210. All the required information that need to build and run the model are specified in the solution configuration file under "Solution Selection" section, including the location of data files and model files, the specifications of solution selection model algorithms, etc.

Figure 5B:
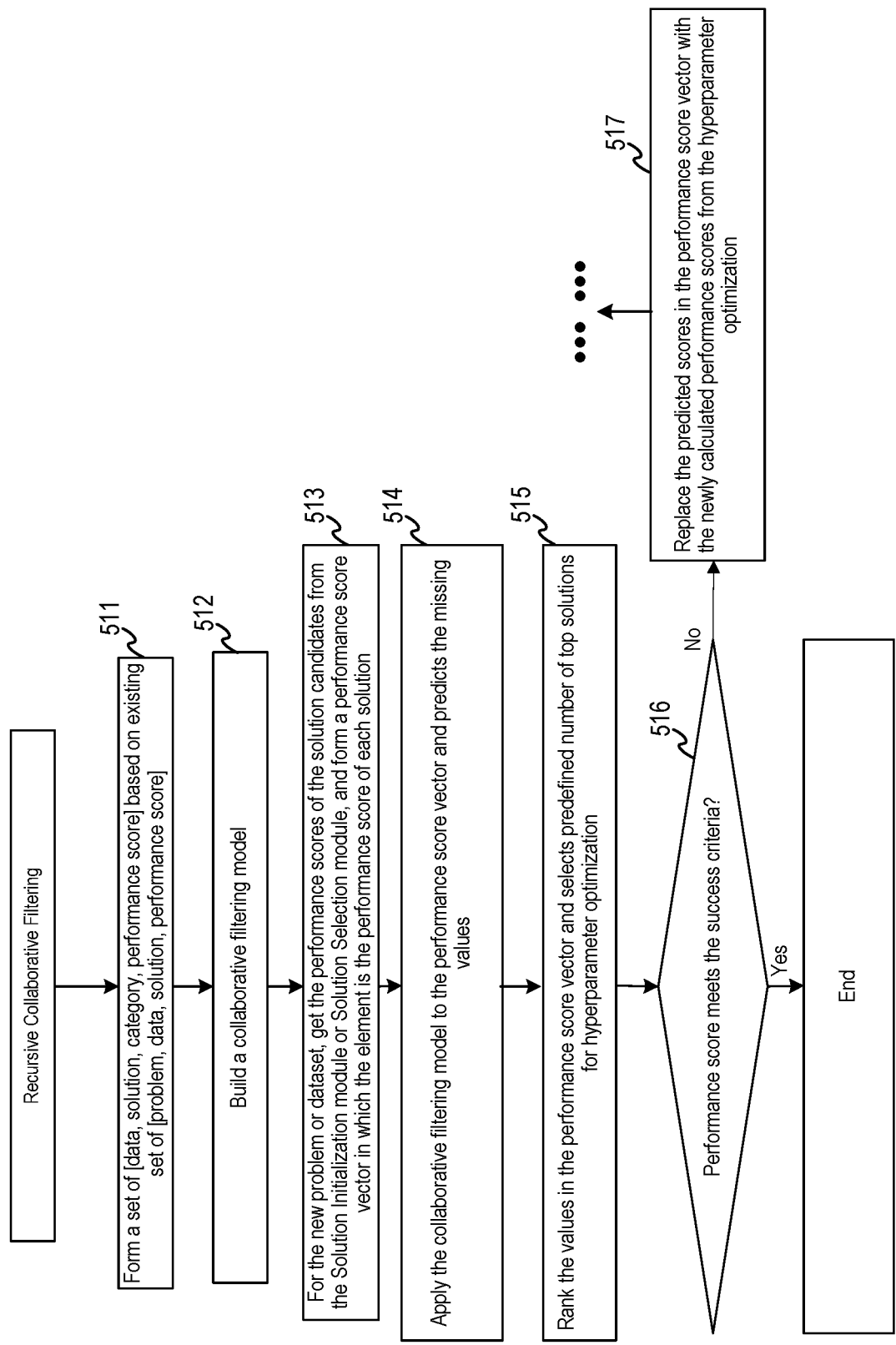
FIG. 5(b) illustrates an example flow for the recursive collaborative filtering, in accordance with an example implementation.

Two approaches can be applied in the solution selection module 220. In a first example, there is recursive collaborative filtering. FIG. 5(b) illustrates an example flow for the recursive collaborative filtering, in accordance with an example implementation, which is directed to the processes at 265 and 270 in FIG. 2(c). In this example, assume a set of quadruples [problem, dataset, solution, performance score] exist. At 511, the process forms a set of [data, solution category, performance score] based on existing set of [problem, data, solution, performance score], where a solution category is defined as an ordered list of steps in data preprocessing 221, feature engineering 222, and model algorithms 223; and the solution category is extracted from the solution field in each set of quadruple [problem, data, solution, performance score]. At 512, the process builds a recursive collaborative filtering model: it can be similarity-based; or through matrix factorization approach. At 513, for the new problem or dataset, the process gets the performance scores of the solution candidates from the solution initialization module 210. Then forms a performance score vector in which the element is the performance score of each solution category. Some of the values will be missing. At 514, the process applies the recursive collaborative filtering model to the performance score vector and predicts the missing values. At 515, the process ranks the values in the performance score vector and selects top M solution categories for hyperparameter optimization, where M is a parameter that controls how many solution categories from model selection module will be used. Here, M can be larger than, equal to, or smaller than N that is defined in 0052. Then from all the solution candidates that match solution categories: solution generator either randomly selects a subset of the solution candidates or uses all of them for hyperparameter optimization.

At 516, a determination is made as to whether any performance score meets the success criteria that is predetermined. If so (Yes), then the process ends. Otherwise (No), if no performance score meets the success criteria, the process proceeds to 517 wherein the newly calculated performance scores from the hyperparameter optimization replace the predicted scores in the performance score vector, update the value of N, update the value of M and then proceeds back to 215 (solution initialization module). This recursive process continues until the performance score meets the success criteria.

Figure 5C:
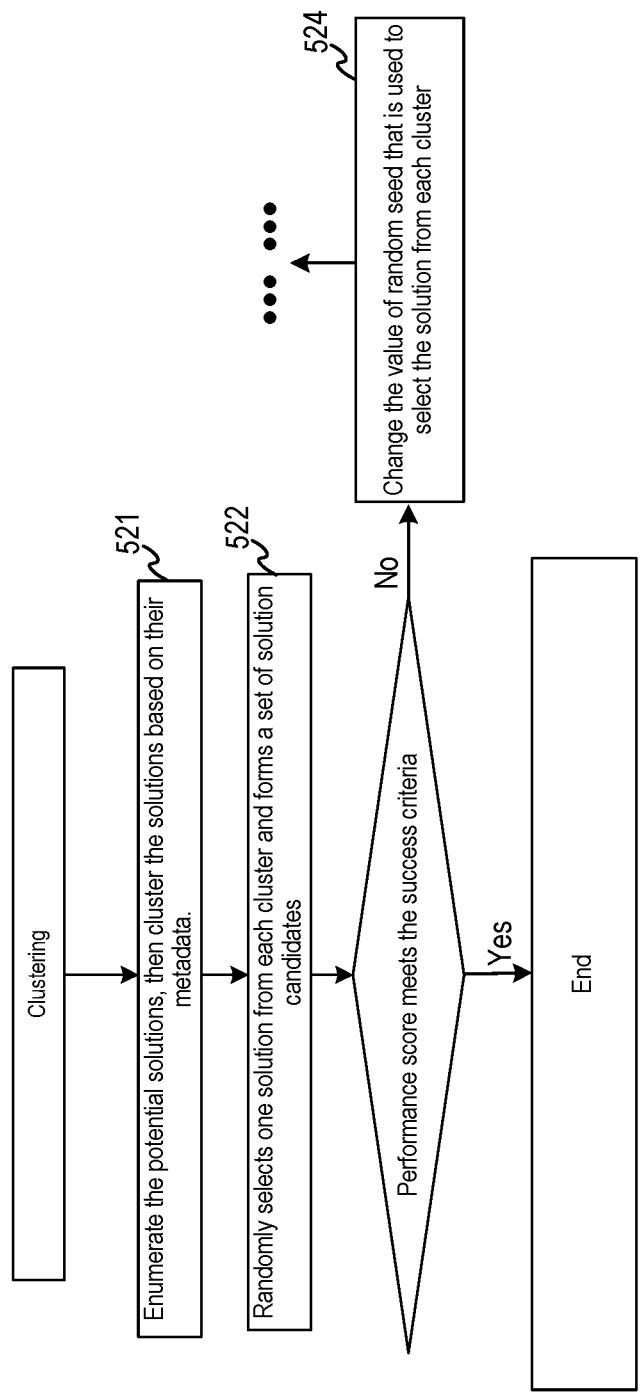
FIG. 5(c) illustrates an example flow for clustering, in accordance with an example implementation.

FIG. 5(c) illustrates an example flow for clustering, in accordance with an example implementation. In a second example of the solution selection module, there is a clustering process wherein it is assumed no historical [problem, dataset, solution, performance score] exist. In this approach, at 521, the process enumerates the potential solution categories, then clusters the solution categories based on their metadata. The metadata here is manually generated based on the domain expertise in machine learning. Example clustering models can be K-means, DBSCAN, etc. At 522, the process randomly selects one solution category from each cluster and forms a set of solution candidates. The solution candidates are then passed to hyperparameter optimization module to find the best solutions with the best parameters. If the performance score from any solution cannot meet the success criteria, then update the clustering parameter: in this case, the random seed that is used to select solution candidates from each cluster. This recursive process continues until the performance score meets the success criteria.

FIG. 5(d) illustrates an example data table for providing performance scores to datasets and solution categories, in accordance with an example implementation. The example of FIG. 5(d) is an example output set for the process at 511 of FIG. 5(b). Based on historical data sets, a matrix can be constructed to relate rows to solution categories (which are extracted from solution candidates), and their associated performance scores. In historical executions of solution candidates to datasets, there can be situations in which a particular dataset was only evaluated by one solution category, or that multiple solution categories may have been applied to a particular data set. Thus, it is possible that some performance scores are thereby missing (NULL) within the matrix.

Thus, through the process of 512-516 of FIG. 5(b), it is possible to fill in the missing performance scores through using estimates generated from the recursive collaborative filtering model. Thus, even if there are no existing performance scores for a particular dataset/solution category pair of interest, estimates can be provided to determine the best solution category, and thus solution candidates.

Figure 6:
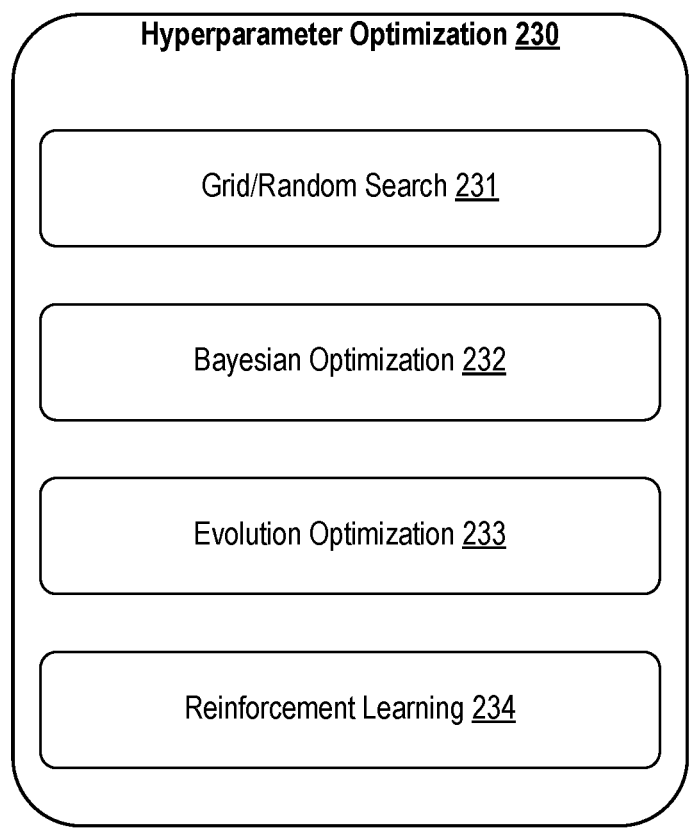
FIG. 6 illustrates an example hyperparameter optimization module, in accordance with an example implementation.

Thus as illustrated through the processes of FIGS. 5(a) and 5(b), when adding a new problem and/or new data set, the solution initialization process is executed to generate the solution candidates. Based on the metadata extraction, related datasets are determined from the historical database to determine related performance scores for the solution candidates. For missing scores, estimates are generated through the process of FIG. 5(b), and then the scores of the matrix are updated through hyperparameter tuning as illustrated in FIG. 6. Once the solution candidates are optimized, a solution candidate with a high performance score can thereby be selected.

FIG. 6 illustrates an example hyperparameter optimization module 230, in accordance with an example implementation. After the solution candidates are generated and selected with the approaches described herein, the hyperparameter optimization module 230 is responsible for optimizing each selected solution candidate with the best set of parameters to make the solution perform with maximum optimization based on the evaluation metrics. In the optimization process, the parameters to be optimized are initialized with the corresponding parameter values in the solution candidates.

There are several categories of optimization methods and example implementations incorporate the state-of-the-art methods such as grid search and random search 231, Bayesian optimization 232, Evolution techniques 233, and Reinforcement learning 234.

Figure 7:
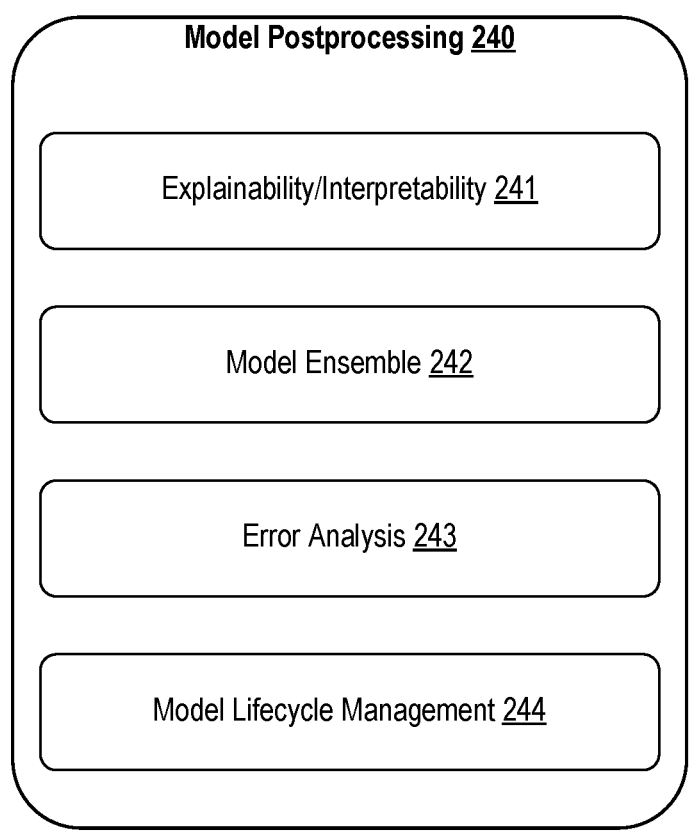
FIG. 7 illustrates an example of the model post-processing module, in accordance with an example implementation.

FIG. 7 illustrates an example of the model post-processing module 240, in accordance with an example implementation. Once the best model(s) are determined, example implementations post-process the models with several components. Some of these components are not available in the related art AutoML library.

Explainability and Interpretability 241 explains and interprets the model and individual predictions. The goal of explainable artificial intelligence (AI) is to identify the attribution of the input variables to the model outcome. Therefore, this provides the relationships between the actions and responses. The attributions express how much the feature affected the change in prediction value, relative to the baseline value. Choosing a meaningful baseline which is relevant to the question being asked of the model is important. Attribution values and their interpretation might change significantly as baselines switching. One example of the baseline can be collected from client interviews.

Variables and parameters are two different setting in the modeling. Parameters are constant during one simulation where variables are changes e.g. $Y=af(X)+b$. a and b are parameters, $f$ is a function, Y is an output variable and X is an input variable in this case. Both approaches use multiple models, thus, the $f$ is actually $f_n$ where n is number of models.

In another example, there is an annealing gradients-based approach. By searching the parameter space via hyperparameter tuning, it distills a traceability of parameter to variable relationship by comparing the baseline and variables importance to the model output. It is repeated through n models. With that, the model output to variables attribution n can be interpreted. Thus, example implementations can thereby calculate the score for each of the selected solution candidates, apply the selected candidates whose score is over the predetermined criteria to new input metadata and obtain the output of the solution.

Model ensemble 242 combines several models into one model for better performance in accordance with the desired implementation. Error analysis 243 analyzes the prediction error to improve the model. Model lifecycle management 244 packages the solution for downstream use.

The proposed AutoML system can be implemented as follows.

The AutoML system can be implemented with a machine learning library involving software components for performing automatic machine learning tasks, including but not limited to: solution initialization, solution selection, data preprocessing, feature preprocessing, hyperparameter optimization, model evaluation, model ensembling, error analysis, model and prediction interpretation, and model lifecycle management. The user writes the code to call the functions in the library and also manage computation and data storage.

In an example implementation, the AutoML system can be implemented as a workbench, which is an on-premise software with a graphical user interface (GUI) that exposes the functions provided in the AutoML library. The user can easily perform automatic machine learning tasks with the GUI. The user is required manage computation and data storage.

In another example implementation, the AutoML system can be implemented as a Software as a Service (SaaS)-based solution which exposes the AutoML library through a web-based user interface. The service provider manages computation and data storage. The user needs to subscribe to the AutoML service, upload the data to the service provider, and use the web-based user interface to perform the automatic machine learning tasks.

Example implementations can be facilitated as a microservices and/or micro-applications to expose the AutoML library.

Example implementations can be facilitated as an open source machine learning library that consists of software components for performing automatic machine learning tasks, including but not limited to: solution initialization, solution selection, data preprocessing, feature preprocessing, hyperparameter optimization, model evaluation, model ensembling, error analysis, model and prediction interpretation, and model lifecycle management. The user needs to write code to call the functions in the library and manage computation and data storage.

Figure 8:
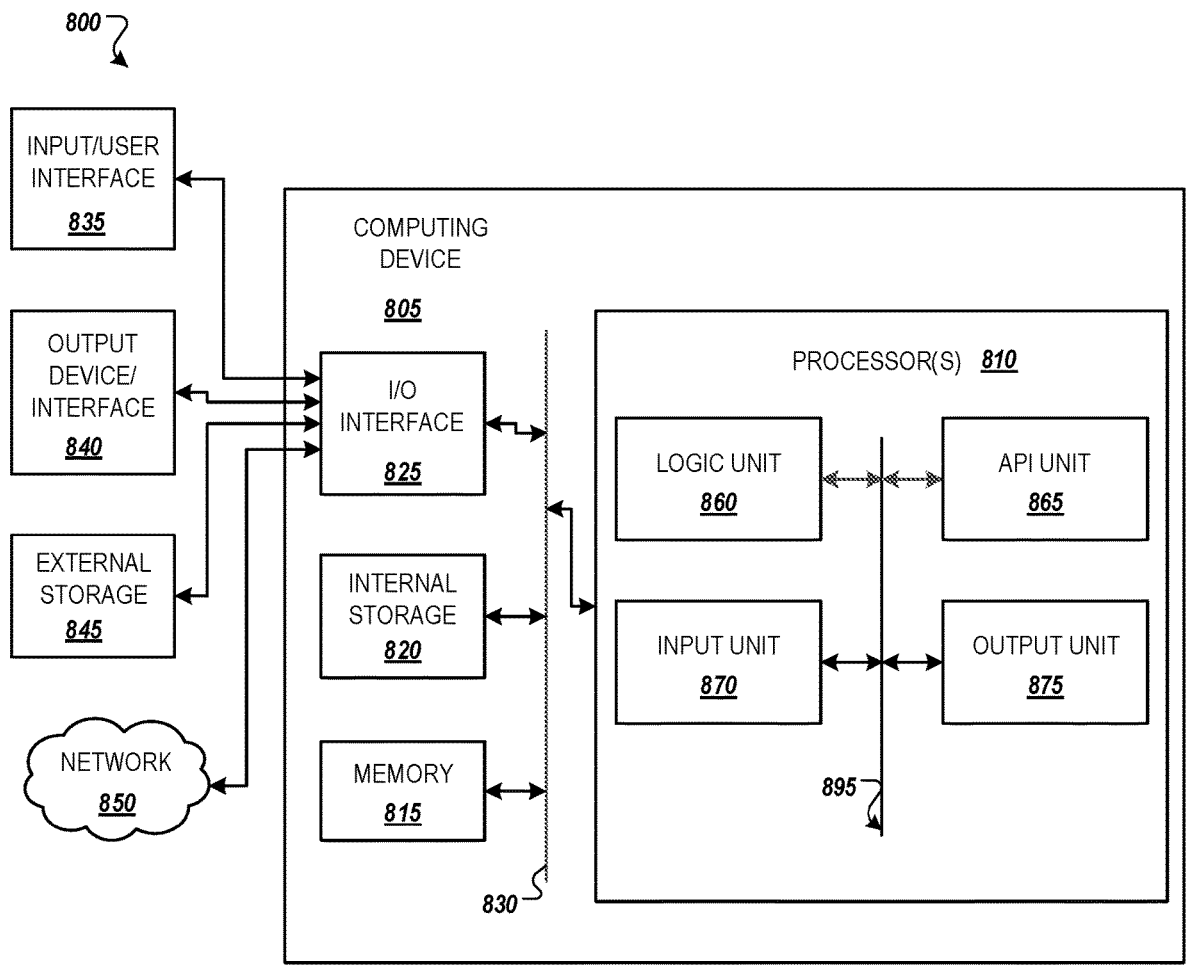
FIG. 8 illustrates an example computing environment with an example computer device suitable for use in some example implementations.

FIG. 8 illustrates an example computing environment with an example computer device suitable for use in some example implementations. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or 10 interface 825, any of which can be coupled on a communication mechanism or bus 830 for communicating information or embedded in the computer device 805. 10 interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via IO interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

IO interface 825 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to generate a unified, customizable and extensible automated machine learning (AutoML) framework configured to input a plurality of machine learning libraries corresponding to a plurality of machine learning models specified in a solution configuration file; extract metadata from a dataset specified by the solution configuration file; generate solution candidates for the dataset from the plurality of machine learning models specified in the solution configuration file by relating the extracted metadata to historical metadata; refine the solution candidates based on historical metadata; optimize the solution candidates through a selection of parameters for the plurality of machine learning models; and evaluate the solution candidates from the plurality of machine learning models based on evaluation parameters specified in the solution configuration file as illustrated in FIGS. 2(a) to 2(c). Such example implementations can thereby utilize a configuration file to facilitate the incorporation of multiple machine learning libraries into the framework and the selected models in the solution configuration file, and the framework can be customized through the solution configuration file in accordance with the desired implementation. Such example implementations are an improvement to related art solutions that only provide for a single static machine learning model for use in the framework.

Processor(s) 810 can be configured to extract problem metadata from a problem specified by the solution configuration file , and wherein the generating the solution candidates by determining associated historical datasets in a database from matching the extracted problem metadata and the extracted data metadata with historical problem metadata and historical data metadata in the database; obtaining the solution candidates and scores for ones of the plurality of machine learning models specified in the solution configuration file that were applied to each of the associated historical datasets; and providing the solution candidates for the problem and dataset based on the scores as illustrated in FIG. 5(b) and FIG. 5(d).

Processor(s) 810 can be configured to refine the solution candidates based on historical metadata by executing recursive collaborative filtering to derive missing scores for ones of the plurality of machine learning models not having the scores for ones of the historical datasets, and then refining the list of solution candidates for the new problem dataset as illustrated in FIG. 5(b).

Processor(s) 810 can be configured to optimize the solution candidates by executing a hyperparameter optimization process for ones of the plurality of machine learning models specified in the solution configuration file corresponding to the solution candidates, and selecting best models determined from the hyperparameter optimization process from the ones of the plurality of machine learning models with best parameters determined from the hyperparameter optimization process as illustrated in FIG. 6.

Processor(s) 810 can be configured to extract metadata from a list of potential solution categories specified by the solution configuration file based on machine learning domain knowledge, and wherein the generating the solution candidates involves clustering solution metadata for each of the plurality of machine learning models specified in the solution configuration file as illustrated in FIG. 5(c).

Processor(s) 810 can be configured to evaluate the solution candidates from the plurality of machine learning models based on evaluation parameters specified in the solution configuration file involving executing model post-processing on ones of the solution candidates associated with a score above a threshold as illustrated in FIG. 7.

Processor(s) 810 can be configured to execute data synthesis on the dataset specified by the solution configuration file to generate additional data for the dataset as illustrated in FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing,""computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:

generating an automated machine learning (AutoML) framework configured to input a plurality of machine learning libraries corresponding to a plurality of machine learning models specified in a solution configuration file;

extracting data metadata from a dataset specified by the solution configuration file;

generating solution candidates for the dataset from the plurality of machine learning models specified in the solution configuration file by relating the extracted data metadata to historical metadata;

refining the solution candidates based on historical metadata;

optimizing the solution candidates through a selection of parameters for the plurality of machine learning models;

evaluating the solution candidates from the plurality of machine learning models based on evaluation parameters specified in the solution configuration file; and when provided data by a user is insufficient, executing data synthesis on the dataset specified by the solution configuration file to generate additional data for the dataset, wherein refining the solution candidates based on historical metadata comprises executing recursive collaborative filtering using a collaborative filtering model to predict missing scores for ones of the plurality of machine learning models not having the scores for ones of the historical datasets, and then refining a list of solution candidates for a new problem dataset, wherein the collaborative filtering model is applied to the missing scores of a performance score vector, and the performance score vector keeps track of scoring for the plurality of machine learning models in association with the historical datasets.

2. The method of claim 1, further comprising extracting problem metadata from a problem specified by the solution configuration file, and wherein the generating the solution candidates comprises:

determining associated historical datasets in a database from matching the extracted problem metadata and the extracted data metadata with historical problem metadata and historical data metadata of the historical dataset in the database;

obtaining the solution candidates and scores for ones of the plurality of machine learning models specified in the solution configuration file that were applied to each of the associated historical datasets; and providing the solution candidates from the machine learning models specified in the solution configuration file based on the scores.

3. The method of claim 1, wherein the optimizing the solution candidates comprises executing a hyperparameter optimization process for ones of the plurality of machine learning models specified in the solution configuration file corresponding to the solution candidates, and selecting best models determined from the hyperparameter optimization process from the ones of the plurality of machine learning models with best parameters determined from the hyperparameter optimization process.

4. The method of claim 1, wherein the extracting metadata from a list of potential solution categories specified by the solution configuration file based on machine learning domain knowledge, and wherein the generating the solution candidates comprises clustering solution metadata for each of the plurality of machine learning models specified in the solution configuration file.

5. The method of claim 1, wherein the evaluating the solution candidates from the plurality of machine learning models based on evaluation parameters specified in the solution configuration file comprises executing model post-processing on ones of the solution candidates associated with a score above a threshold.

* * * * *